(12) United States Patent
Cologna

(10) Patent No.: US 8,463,528 B2
(45) Date of Patent: Jun. 11, 2013

(54) SYSTEMS AND METHODS FOR USING SECONDARY FUELS

(76) Inventor: Chris M. Cologna, Bountiful, UT (US)

( * ) Notice: Subject to any disclaimer, the term of this patent is extended or adjusted under 35 U.S.C. 154(b) by 761 days.

(21) Appl. No.: 12/464,807

(22) Filed: May 12, 2009

(65) Prior Publication Data

US 2010/0292911 A1 Nov. 18, 2010

(51) Int. Cl.
*F02B 13/00* (2006.01)
*G06F 7/00* (2006.01)

(52) U.S. Cl.
USPC ........... 701/104; 701/105; 701/115; 123/486; 123/575; 123/304

(58) Field of Classification Search
USPC ................. 123/472, 486, 575, 576, 577, 578, 123/588, 27 GE, 527, 1 A; 701/101, 102, 701/103, 104, 105, 115, 10
See application file for complete search history.

(56) References Cited

U.S. PATENT DOCUMENTS

| | | | |
|---|---|---|---|
| 4,606,322 A | 8/1986 | Reid et al. | |
| 4,682,293 A * | 7/1987 | Goldenberg et al. | 701/104 |
| 4,817,568 A | 4/1989 | Bedford | |
| 5,224,457 A | 7/1993 | Arsenault et al. | |
| 5,379,740 A | 1/1995 | Moore et al. | |
| 5,542,392 A * | 8/1996 | Povinger | 123/480 |
| 5,881,703 A * | 3/1999 | Nankee et al. | 123/686 |
| 6,102,009 A | 8/2000 | Nishiyama | |
| 6,321,694 B1 | 11/2001 | Vergine et al. | |
| 6,694,242 B2 * | 2/2004 | Wong | 701/104 |
| 6,879,903 B2 | 4/2005 | Jaliwala et al. | |
| 6,915,776 B2 | 7/2005 | zur Loye et al. | |
| 6,951,210 B2 | 10/2005 | Landi et al. | |
| 7,000,600 B1 | 2/2006 | Yamada et al. | |
| 7,305,939 B2 * | 12/2007 | Carlson | 123/27 GE |
| 7,487,761 B1 * | 2/2009 | Culbertson et al. | 123/497 |
| 7,567,866 B2 * | 7/2009 | Kokubu | 701/113 |
| 7,886,719 B2 * | 2/2011 | Thomas | 123/478 |
| 7,983,831 B2 * | 7/2011 | Tsunooka | 701/104 |
| 2003/0131827 A1 * | 7/2003 | Dobryden et al. | 123/480 |
| 2007/0175459 A1 * | 8/2007 | Williams et al. | 123/575 |
| 2008/0264394 A1 * | 10/2008 | Spivak | 123/575 |
| 2009/0112443 A1 * | 4/2009 | Kawamura et al. | 701/103 |
| 2009/0114188 A1 * | 5/2009 | Peters et al. | 123/406.19 |
| 2010/0042309 A1 * | 2/2010 | Polach et al. | 701/105 |
| 2010/0198486 A1 * | 8/2010 | Streib et al. | 701/104 |

FOREIGN PATENT DOCUMENTS

WO WO 2005/031139 4/2005

* cited by examiner

*Primary Examiner* — Stephen K Cronin
*Assistant Examiner* — Raza Najmuddin
(74) *Attorney, Agent, or Firm* — Kunzler Law Group

(57) ABSTRACT

The present application provides a system and method for determining a secondary fuel amount for an engine. The method comprises measuring an injector signal from an engine's Engine Control Unit (ECU) for a primary injector. A delay time of the primary injector can be determined using a lookup table. An open time can be calculated based on the delay time and the primary timing value. An amount of fuel to be injected into the engine can be calculated based on the primary injector open time. An amount of secondary fuel equivalent to the amount of primary fuel can be determined. A timing value for a secondary injector signal for the secondary injector can be calculated to deliver the amount of secondary fuel to the engine.

21 Claims, 4 Drawing Sheets

Injector Delay Times (ms)

| | | | | | | | |
|---|---|---|---|---|---|---|---|
| 336 | 1.21094 | 1.03906 | 0.88281 | 0.76563 | 0.65625 | 0.57813 | 0.52344 |
| 320 | 1.1875 | 1.01563 | 0.86719 | 0.75 | 0.64844 | 0.57031 | 0.52344 |
| 304 | 1.7188 | 1.00 | 0.85938 | 0.74219 | 0.64023 | 0.5625 | 0.52344 |
| 288 | 1.15625 | 0.98438 | 0.84375 | 0.72656 | 0.63281 | 0.5625 | 0.51563 |
| 272 | 1.13281 | 0.96875 | 0.83594 | 0.71875 | 0.625 | 0.55469 | 0.51563 |
| 256 | 1.11719 | 0.95313 | 0.82031 | 0.71094 | 0.61719 | 0.55469 | 0.50781 |
| 240 | 1.10156 | 0.94531 | 0.8125 | 0.70313 | 0.60938 | 0.54688 | 0.50781 |
| | 10 | 11 | 12 | 13 | 14 | 15 | 16 |

Fuel Pressure (Δ kpa)

Injector Voltage (volts)

FIG. 1

SYSTEMS AND METHODS FOR USING SECONDARY FUELS

FIELD OF THE INVENTION

The present invention relates generally to mechanical systems and methods. More particularly, the present invention relates to using secondary fuels in engines.

BACKGROUND

Engines and mechanical devices have long been dependent upon fossil fuels. Petroleum products have provided 96 percent of America's transportation energy needs. However, such usage has had environmental impacts. Specifically, using petroleum products in engines is known to cause pollution and increase greenhouse gasses. In addition to carbon dioxide, combustion of fossil fuels is known to create noxious byproducts ($NO_x$, $CO_x$, etc.). Additionally, the rising costs of petroleum products can cause significant economic impact. As such, research and development into alternate fuels is continually sought. Such fuels include electricity, hydrogen, natural gas, etc.

SUMMARY OF THE INVENTION

In light of the foregoing, the Applicants have recognized a need to develop systems and methods that can determine and/or deliver a secondary fuel to replace or supplement a primary fuel in an engine. Accordingly, the present application provides for a method of supplying a secondary fuel to an engine. The method comprises measuring an injector signal from the engine's engine control unit (ECU) for a primary injector for a primary fuel to determine a timing value for the primary injector. Additionally, the method can include determining a delay time of the primary injector using a lookup table configured to provide the delay time of the primary injector. The delay time can be used to determine an open time of the primary injector based on a difference between the primary timing value and the delay time. The open time can be used to calculate a predetermined amount of the primary fuel to be injected into the engine during the primary injector's open time according to the injector signal. Further the method can include determining an amount of secondary fuel equivalent to the primary fuel. Such a method can also include calculating a secondary timing value for a secondary injector signal for the secondary injector to deliver the amount of secondary fuel to the engine.

In another embodiment, a secondary fuel control system for an engine can comprise a detector configured to detect a timing value from an ECU injection signal for a primary injector. The secondary fuel control system can include a lookup table coupled to the detector and configured to provide a delay time of the primary injector for injecting a predetermined amount of the primary fuel into the engine. Additionally, the secondary fuel control system can include a secondary fuel equivalent module coupled to the lookup table and configured to calculate an amount of a secondary fuel having an energy equivalent to the predetermined amount of primary fuel by calculating an energy value of the predetermined amount of primary fuel, calculating the amount of the secondary fuel needed to provide the energy equivalent, and calculating a secondary timing value for a second injector to inject the energy equivalent of the secondary fuel into the engine in place of the primary fuel.

In still another embodiment, a secondary fuel control system for an engine can comprise a detector configured to detect a timing value from an ECU injection signal for a primary injector. The secondary fuel control system can include a first lookup table coupled to the detector and configured to provide a delay time of the primary injector for injecting a predetermined amount of the primary fuel into the engine and a second lookup table coupled to a secondary fuel equivalent module and configured to provide a ratio of secondary fuel to primary fuel for the engine. The secondary fuel control system can include a secondary fuel equivalent module coupled to the first lookup table and the second lookup table such that the secondary fuel equivalent module is configured to calculate an amount of a secondary fuel having an energy equivalent based on the ratio of secondary fuel to primary fuel by calculating an energy value of the predetermined amount of primary fuel, calculating the amount of the secondary fuel needed to supplement the primary fuel to provide the ratio, and calculating a secondary timing value for a second injector to inject the energy equivalent of the secondary fuel into the engine.

Additional features and advantages of the invention will be apparent from the following detailed description, which illustrates, by way of example, features of the invention.

BRIEF DESCRIPTION OF THE DRAWINGS

Additional features and advantages of the invention will be apparent from the detailed description which follows, taken in conjunction with the accompanying drawings, which together illustrate, by way of example, features of the invention.

FIG. 1 is a table showing injector delay times based on injector voltage and fuel pressure in accordance with an embodiment of the present invention.

Figure 2:
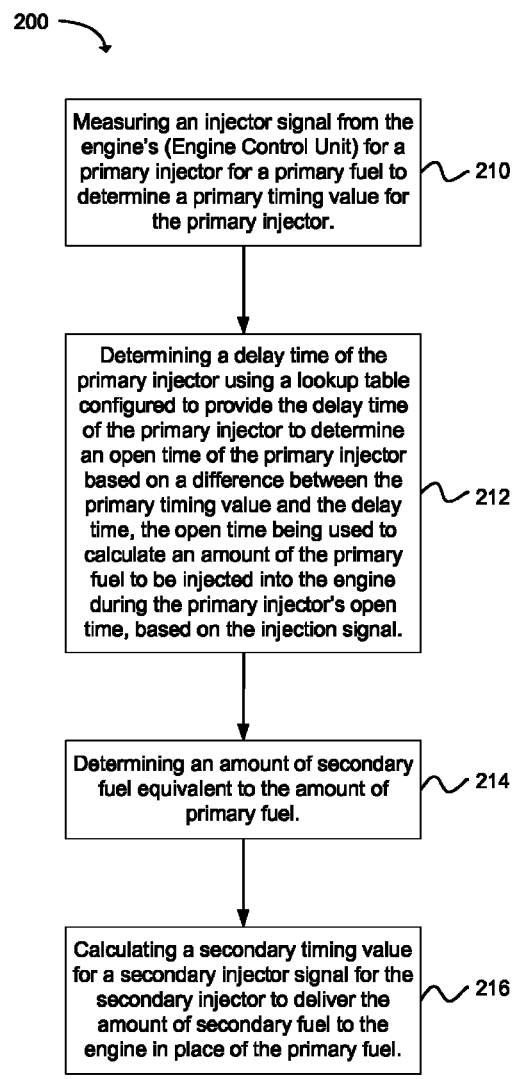
FIG. 2 is a schematic flow diagram illustrating one embodiment of a method for supplying a secondary fuel to an engine in accordance with the present application.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENTS

Before particular embodiments of the present invention are disclosed and described, it is to be understood that this invention is not limited to the particular process and materials disclosed herein as such may vary to some degree. It is also to be understood that the terminology used herein is used for the purpose of describing particular embodiments only and is not intended to be limiting. The scope of the present invention will be defined only by the appended claims and equivalents thereof.

In describing and claiming the present invention, the following terminology will be used.

The singular forms "a," "an," and "the" include plural referents unless the context clearly dictates otherwise. Thus, for example, reference to "an injector" includes reference to one or more of such injectors.

As used herein, the term "about" is used to provide flexibility to a numerical range endpoint by providing that a given value may be "a little above" or "a little below" the endpoint.

The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 0.01 to 2.0 mm" should be interpreted to include not only the explicitly recited values of about 0.01 mm to about 2.0 mm, but also include individual values and sub-ranges within the indicated range. Thus, included in this numerical range are individual values such as 0.5, 0.7, and 1.5, and sub-ranges such as from 0.5 to 1.7, 0.7 to 1.5, and from 1.0 to 1.5, etc. Furthermore, such an interpretation should apply regardless of the breadth of the range or the characteristics being described.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

The described features, structures or characteristics described herein may be combined in any suitable manner in one or more embodiments. Furthermore, one skilled in the relevant art will recognize that the invention can be practiced without one or more of the specific details, methods, components, materials, etc. In other instances, well-known components, methods, structures, and materials may not be shown or described in detail to avoid obscuring aspects of the invention.

It has been recognized that it would be advantageous to develop a secondary fuel control system for determining and/or delivering a secondary fuel to replace or supplement a primary fuel in an engine. For example, the secondary fuel control system can be used to deliver a secondary fuel such as compressed natural gas to replace gasoline used in an engine designed to operate with gasoline fuel. Alternatively, the secondary fuel control system can be used to supplement diesel fuel used in a diesel engine designed to operate with diesel fuel. Other types of secondary fuels that can be used as a replacement or supplement include propane, hydrogen, biodiesel, bioalcohol (methanol, ethanol, butanol), non-fossil methane, non-fossil natural gas, vegetable oil, and other biomass sources. A secondary fuel, as used herein, is considered to be any type of chemical fuel for which the engine was not specifically designed that contains sufficient energy to enable the engine to operate within the engine's design parameters. Thus, the secondary fuel control system may be used to convert an engine to operate on or be supplemented with a secondary fuel such as gasoline or diesel fuel when the engine is specifically designed to operate using hydrogen as a primary fuel.

The secondary fuel control system enables an engine to use these secondary fuels in a manner that will enable the engine to operate in accordance with its design parameters. By operating the engine within its design parameters, engine emissions can be minimized, thereby enabling the secondary fuel to be used in an efficient manner while diminishing the environmental effects of using the secondary fuel.

In accordance with this, the present invention is drawn to systems and methods having a detector, a look-up table, and a secondary fuel equivalent module. It is noted that when discussing a secondary fuel control system or a method of supplying a secondary fuel to an engine, each of these discussions can be considered applicable to each of these embodiments, whether or not they are explicitly discussed in the context of that embodiment. Thus, for example, in discussing a primary injector for a secondary fuel control system, those injectors can also be used in a method of supplying a secondary fuel to an engine, and vice versa.

Generally, conversion or supplementation of a primary fuel with a secondary fuel involves the addition of a secondary fuel injector. However, determination of the amount of secondary fuel necessary for delivery can be complicated. The actual determination is dependent on a large number of variables related to the environment and the functioning of the engine. Additionally, for example, various engine parameters, including rpm, temperature, load, etc., can affect the amount of fuel needed to run an engine efficiently and effectively. Previous attempts to convert an existing engine to run on a secondary fuel have largely been done by selecting a fixed set of variables to determine an optimal amount of secondary fuel. However, when the variables stray outside the fixed set, both the performance of the engine and the quality of the exhaust can be significantly degraded.

To overcome these problems, the present inventor has recognized the need to develop a dynamic fuel delivery system for a secondary fuel rather than rely on inefficient and inaccurate static systems. As such, the present inventors have developed dynamic secondary fuel delivery systems and methods that use real time engine conditions and operating parameters to determine substantially optimal amounts of secondary fuel to either replace or supplement the primary fuel.

Modern car manufacturers use a computer called an engine control unit that receives multiple inputs to determine an optimal amount of fuel to provide a desired amount of power to the engine while minimizing pollutants. Generally, the systems and methods described herein can use the primary injector signal from the engine's ECU to determine an accurate secondary injector signal for a secondary fuel. Such methods and systems generally use a lookup table that can be populated for various engine parameters to provide an appropriate offset value for the secondary fuel rather than a static preprogrammed value as commonly performed in the art. The lookup table can be populated for a specific injector as well as specific engine conditions that can affect an injector offset value, such as, for example, fuel pressure differential between the high pressure side and the low pressure side of the injector, as well as injector voltage. As such, the present methods and systems can provide a real time dynamic delivery of a secondary fuel amount. The ability to dynamically alter the amount of secondary fuel based on real time operating conditions of the engine enables accurate delivery of an amount of secondary fuel that can provide a desired power level from the automobile engine while minimizing pollutants from the exhaust system. By using the primary injector signal from the ECU and the dynamic operating conditions of the automobile engine, an engine can be efficiently converted to use a secondary fuel while maintaining or exceeding the automobile's performance and pollution standards, as set by the auto manufacturer that designed the car. This enables an automobile engine to be converted relatively inexpensively to use a secondary fuel while continuing to meet the fairly rigid standards set by State and Federal environmental regulations.

The amount of primary fuel that is delivered to an engine is determined by the ECU signal to the engine's primary injector. The signal is typically a pulse width signal that instructs the injector to open an amount of time that is proportional to the length of the injector signal (pulse width) from the ECU. Constantly changing engine parameters cause differing delays between when the injector is instructed to open and when it actually opens. This delay is referred to as a delay time, or equivalently, as an offset value. For example, a change in voltage at the injector can cause the speed of the injector to either increase or decrease. Similarly, a change in fuel pressure differential between the high pressure side and the low pressure side of the injector can also cause the injector speed to increase or decrease. The actual amount of time that the injector is open, allowing fuel to flow, depends on these changing variables. For example, an injector signal at a selected time may be high, or "on" for 10.2 milliseconds (ms). However, the fuel pressure differential and the injector voltage at the selected time may be such that the injector is only open for 8.5 ms. Thus, there is a delay time of 1.7 ms.

In order to determine the actual amount of primary fuel that is injected into the engine, a multi-dimensional table can be created that shows the delay time of the injector for various voltages and fuel pressure differentials. The delay time is typically similar for a specific model of injector. A different table can be created for each different model of injector that is used. An injector can be characterized based on information provided by the manufacturer. Alternatively, the injector can be characterized by measuring the parameters for each table entry using a laboratory setup.

The granularity of the table can be based on the accuracy needs of the conversion. In addition, known algorithms can be used to interpolate between values in the table, thereby enabling increased accuracy without the need for extremely large tables. A portion of one exemplary lookup table is shown in FIG. 1. In this example a gasoline injector is shown. Similar lookup tables can be constructed for diesel fuel injectors. Typically each lookup table is unique to a particular brand, or type of injector. The table shows delay times for a specific injector based on selected injector voltages and varying changes in fuel pressure between the high pressure side of the injector and the low pressure side of the injector. While fuel pressure differential and injector voltage are specifically identified as variables affecting the delay time, additional engine parameters can also be taken into account and used to refine the delay time in a multi-dimensional table.

As such, with this discussion and these definitions in mind, the present application provides for a method 200 of determining a secondary fuel amount for an engine, as shown in the flow chart of FIG. 2. The method includes the operation of measuring 210 an injector signal from the engine's Engine Control Unit (ECU) for a first injector for a primary fuel to determine a timing value for the first injector, wherein the timing value is related to an amount of primary fuel to be delivered to the engine. Additionally, the method can include the operation of determining 212 a delay time of the primary injector using a lookup table configured to provide the delay time of the primary injector. The delay time can be used to determine an open time of the primary injector based on a difference between the timing value and the delay time. The open time can be used to calculate a predetermined amount of the primary fuel to be injected into the engine during the primary injector's open time based on the injection signal. Further, the method can include determining 214 an amount of secondary fuel equivalent to the amount of primary fuel. Also, the method can include calculating 216 a secondary timing value for a second injector to deliver the amount of secondary fuel to the engine in place of the primary fuel.

Additionally, the method can further comprise measuring a pressure differential of the primary fuel. The method can further comprise measuring a voltage of the first injector. These measurements can be performed at separate times or can be performed at approximately the same time. In one embodiment, the pressure or voltage may be substantially constant. In that case, the constant value can be included in a lookup table, without the need to measure the value. Additionally, the method can comprise calculating a delay time associated with the first injector based on the pressure differential of the primary fuel and the voltage of the first injector using a lookup table.

Additionally, the method can comprise measuring a pressure differential of a secondary fuel. The method can further comprise measuring a voltage of a secondary injector. These measurements can be performed at separate times or can be performed at approximately the same time. Additionally, the method can comprise calculating a delay time associated with the secondary injector from the pressure differential of the secondary fuel and the voltage of the secondary injector using a lookup table. Further the step of calculating the amount of secondary fuel needed to provide the energy value can include accounting for the delay time associated with the second injector. In one embodiment, the method can further include combusting the secondary fuel.

In another embodiment, a secondary fuel control system for an engine can comprise a detector configured to detect a timing value from an ECU injection signal for a primary injector. The secondary fuel control system can include a lookup table coupled to the detector and configured to provide a delay time of the primary injector for injecting a predetermined amount of the primary fuel into the engine. Additionally, the secondary fuel control system can include a secondary fuel equivalent module coupled to the lookup table and configured to calculate an amount of a secondary fuel having an energy equivalent to the predetermined amount of primary fuel by calculating an energy value of the predetermined amount of primary fuel, calculating the amount of the secondary fuel needed to provide the energy equivalent, and calculating a secondary timing value for a second injector to inject the energy equivalent of the secondary fuel into the engine in place of the primary fuel.

In still another embodiment, a secondary fuel control system for an engine can comprise an injection signal timing detector configured to detect a timing value from an ECU injection signal for a primary injector. The secondary fuel control system can include a first lookup table coupled to the timing detector. The first lookup table can be configured to provide a delay time of the primary injector based on selected operational variables of the engine. For example, the operation variables can include the voltage at the injector and the fuel pressure differential at the injector. The amount of the primary fuel that is typically injected into the engine in response to the timing value of the ECU injection signal for the primary injector can be determined in the lookup table based on the value of the variables such as the injector voltage and the fuel pressure differential. A second lookup table can be coupled to a secondary fuel equivalent module and configured to provide a ratio of secondary fuel to primary fuel for the engine. The secondary fuel control system can include a secondary fuel equivalent module coupled to the first lookup table and the second lookup table such that the secondary fuel equivalent module is configured to calculate an amount of a secondary fuel having an energy equivalent based on the ratio of secondary fuel to primary fuel by calculating an energy value of the predetermined amount of primary fuel, calculating the amount of the secondary fuel needed to supplement the primary fuel to provide the ratio, and calculating a secondary timing value for a second injector to inject the energy equivalent of the secondary fuel into the engine.

Figure 3:
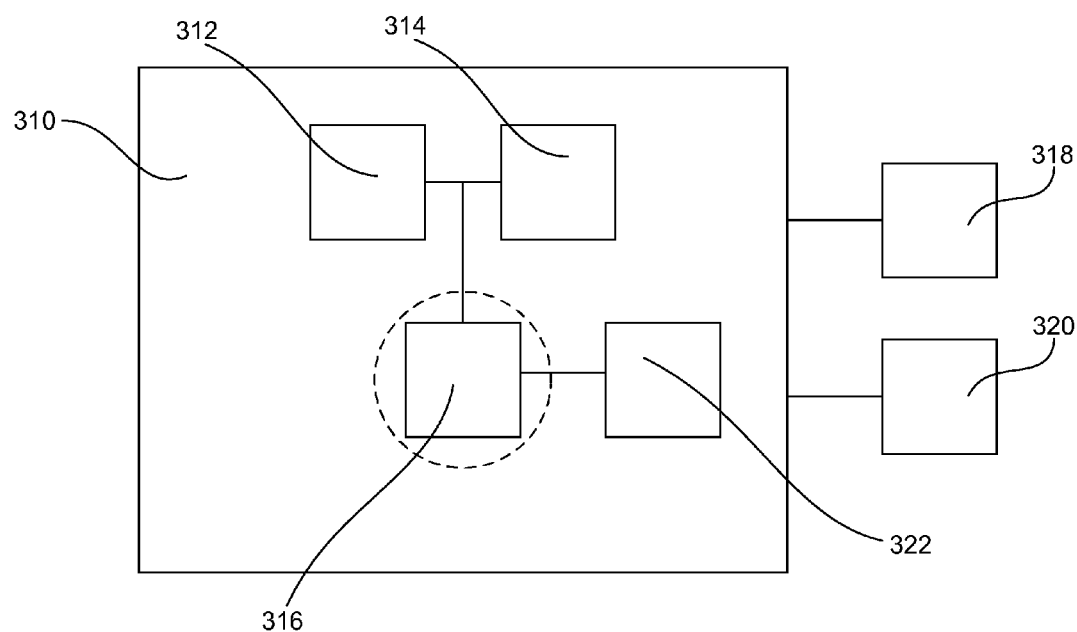
FIG. 3 is a schematic diagram of one embodiment of the system of the present invention.

Turning now to FIG. 3, an engine 310 can comprise an engine control unit (ECU) 312 in communication with a primary injector 314. Additionally, the engine can be coupled to a secondary fuel equivalent module 316. The secondary fuel equivalent module is discussed in further detail in FIG. 4. The engine can be connectable to a primary fuel 318 and a secondary fuel 320. As described herein, the secondary fuel equivalent module can calculate a timing value for a second injector 322. Generally, the secondary fuel equivalent module can measure the timing value associated with the primary injector and calculate the timing value for a secondary injector in order to inject an amount of secondary fuel sufficient to replace or supplement the amount of primary fuel needed to sustain the desired operating condition of an engine.

Figure 4:
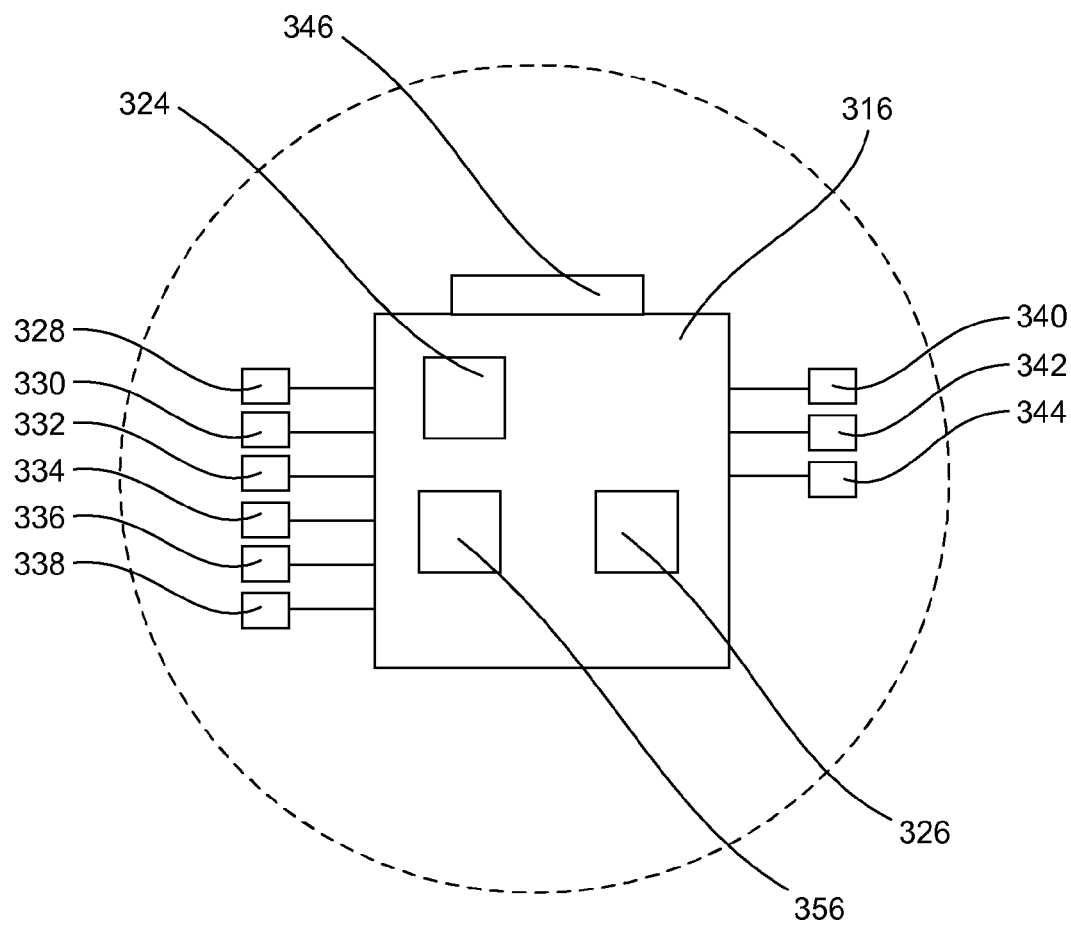
FIG. 4 is an enlarged view of the secondary fuel control system in accordance with an embodiment of the present invention.

Turning now to FIG. 4, the secondary fuel equivalent module 316 can be coupled to a detector 324 and can be further coupled to a first lookup table 326 and a second lookup table 356. As such, in one embodiment, the secondary fuel equivalent module can include the detector and the lookup tables. However, such a configuration is not necessary as the detector and lookup tables can be external to the secondary fuel equivalent module. One or more lookup tables may be integrated in or coupled to the secondary fuel equivalent module.

Generally, the detector 324 is electrically coupled to the ECU such that the detector can measure the injector signal of the primary injector from the ECU. As such, the detector can be configured to detect a timing value from the ECU injection signal for a primary injector, generally determined by the timing of the pulse width of the ECU injection signal. The lookup table(s) can be a data array that provides the delay time for an injector based upon various engine variables. For example, in one embodiment, the lookup table can be used to provide a delay time associated for an injector based upon the voltage of the injector and the pressure differential of the fuel being injected by the injector. As such, the present discussion is applicable to a primary injector used in conjunction with a primary fuel. The discussion can also be applicable to a secondary injector used in conjunction with a secondary fuel.

The methods and systems described herein can have any number of lookup tables. For example, in one embodiment, the methods and systems can have a first lookup table that can provide a delay time for a primary injector and a second lookup table that can provide a delay time for a secondary injector. The delay time can be calculated as described herein. In one embodiment, the delay time can be determined from fuel pressure differential and a voltage measured at the injector. Generally, such lookup tables are predetermined and populated based upon manufacturing specifications of the injector. Alternatively, the values can be predetermined and populated based upon an array of measurements covering operating conditions of the injector. Such an array can be experimentally determined, as previously discussed.

Even though the present discussion refers to lookup tables for providing offset values, the present invention can also include lookup tables for providing a ratio of primary fuel to secondary fuel based upon desired performance and/or engine characteristics. Generally, the ratio can be predetermined and populated in a lookup table and accessed by various variables, e.g., temperature, rpm, load, etc.

Additionally, the secondary fuel equivalent module 316 can further comprise an input 328 configured to receive a signal containing information of a fuel pressure for the primary fuel to calculate the delay time. The pressure of the primary fuel is typically the difference (delta) between the high pressure side of the injector and the low pressure side of the injector. The secondary fuel equivalent module can further comprise an input 330 configured to receive a signal containing information of a low side fuel pressure for the secondary fuel and an input 332 configured to receive a signal containing information of a high side pressure of the secondary fuel. As such, in one embodiment, the secondary fuel equivalent module can calculate a flow rate of the secondary fuel using the low side fuel pressure and the high side fuel pressure information. This information can be used to determine how long the secondary injector needs to remain open to allow the desired amount of secondary fuel into the engine.

The secondary fuel equivalent module 316 can further comprise an input 334 configured to receive a signal containing information of a tank pressure for the secondary fuel to calculate a fuel level signal for the secondary fuel. The fuel level signal can then be used to provide a secondary fuel level via a fuel gauge, fuel electronic display, or other appropriate device. The secondary fuel equivalent module can further comprise an input 336 configured to receive a signal containing information of a temperature for the secondary fuel. The temperature can be used to calculate a density of the secondary fuel. The secondary fuel equivalent module can further comprise an input 338 configured to receive a signal containing information of the primary fuel level. The primary fuel level can be modified to reflect the use of the secondary fuel.

Additionally, the secondary fuel equivalent module 316 can further comprise an output 340 configured to send a signal containing information of a fuel pressure for the primary fuel for use by the ECU. The secondary fuel equivalent module can further comprise an output 342 configured to send a signal containing information of a fuel level for the secondary fuel for use by a fuel level indicator. The secondary fuel equivalent module can further comprise an output 344 configured to send a signal containing information of an injector pulse for the secondary injector for the secondary fuel corresponding the secondary timing value. Further, in one embodiment, the secondary fuel equivalent module further can comprise a communication port 346 for programming and diagnostic testing.

As described herein, in one embodiment, the delay times of the first injector can be used to accurately calculate the actual amount of primary fuel asked for by the ECU injector signal. The delay time of the second injector can then be calculated in a similar fashion to determine the length of an injector pulse needed to allow a desired amount of secondary fuel into the engine using the second injector. In one embodiment, the amount of secondary fuel can have a substantially equal energy content as the amount of primary fuel. Alternatively, the amount of secondary fuel selected can be used to supplement the primary fuel, rather than replace it.

The secondary fuel equivalent module 316 can further comprise an expansion socket 346 for additional injector outputs. Additionally, the secondary fuel equivalent module can further comprise various detectors and electrical components (not shown) for determining the various signals described herein. For example, the secondary fuel equivalent module can further comprise a fuel pressure detector for measuring the low and high side fuel pressure of a secondary fuel and an electrical component for attachment of the detector to the inputs described herein for communicating the low and high side fuel pressure in the form of an electrical signal.

In one embodiment, the amount of secondary fuel can replace the primary fuel. In another embodiment, the amount of secondary fuel can supplement the primary fuel. In one aspect, the secondary fuel can account for at least 50% of the total fuel delivered to the engine. In another aspect, the secondary fuel can account for at least 90% of the total fuel delivered to the engine. Of course, varying amounts of secondary fuel can also be used, including without limitation, 60%, 70%, and 80%.

EXAMPLES

The following descriptions provide various example embodiments. The representative examples are not intended to be exclusive. The term "fuel pressure", as used in the examples, is intended to mean a pressure differential between a high side and low side of the injector. The voltage is measured at the injector.

Example 1

Conversion of Gas to CNG

A gasoline (primary) injector pulse from an engine control unit (ECU) is captured and is measured as 4.78 ms. The gasoline injector offset value (delay time) is determined to be 1.22 ms. The gasoline injector offset value is provided by a lookup table based on current system voltage of the gasoline injector, 12.7 volts, and fuel pressure of the gasoline, 43.5 psi. This offset value, 1.22 ms, is subtracted from the gasoline injector pulse, 4.78 ms, (4.78 ms−1.22 ms) to provide a gasoline injector open time of 3.56 ms, which corresponds to the amount of gasoline delivered to the engine. The actual amount of gasoline can be determined by multiplying the injector open time by the flow rate of gasoline at the current fuel pressure of the gasoline; i.e., 30 pounds/hour at 43.5 psi.=(30 pounds/3600 sec)=0.0083333 pound/sec→ (0.0083333 pounds/sec*0.00356 sec), providing 0.0000296 pounds of gasoline per pulse. The gasoline pound per pulse amount is then multiplied by a gasoline fuel stoichiometric ratio; i.e., 14.7 pounds of air per pound of fuel, (0.0000296*14.7) providing 0.00043512 pounds of air to combust each pulse amount.

The amount of air needed to combust the gasoline can then be divided by an alternate fuels stoichiometric ratio to find an equivalent amount of secondary fuel to the gasoline. For example, natural gas uses 17.2 pounds of air to combust one pound of fuel. The amount of natural gas can be determined by dividing the air required to combust the gasoline by the stoichiometric ratio (0.00043512 pounds/17.2), which results in 0.000025297 pounds of alternate fuel (natural gas in this example) per pulse for a secondary injector. A flow rate of the natural gas for the natural gas fuel injector (secondary fuel) can be determined at the current fuel pressure of the natural gas and the temperature of the natural gas using a lookup table. For example, at a temperature of 50 deg and a fuel pressure of 150 psi=28 pound/hr=28 pounds/3600 sec=0.0077777 pounds/sec. The fuel demand, i.e., the amount of time needed to deliver the natural gas, is determined by dividing the natural gas needed by flow rate per second of natural gas injector; i.e., (0.000025297 pounds/ 0.0077777)=0.00325 sec or 3.25 ms fuel demand. The new injector pulse width for the secondary injector is determined by adding the fuel demand to natural gas injector offset at the current system voltage for the secondary injector and natural gas pressure from a lookup table. For example, if the voltage at the secondary injector is 12.5 volts and the fuel pressure is 150 psi, a delay time of 2.94 ms can be determined from a lookup table for the secondary injector. The total pulse width for the secondary injector signal is the delay time of 2.94 ms plus the injector open time of 3.25 ms for a total of 6.19 ms pulse width for the secondary injector signal.

Example 2

Supplement of Diesel with CNG

A diesel (primary) injector pulse from an engine control unit (ECU) is captured and is measured as 4.78 ms. The diesel injector offset value (delay time) is determined to be 1.22 ms from a lookup table. The diesel injector offset value is provided by a lookup table, similar to the one shown in FIG. 1, based on current system voltage of the diesel injector, 12.7 volts, and fuel pressure (delta) of the diesel, 43.5 psi. The corresponding offset value, 1.22 ms, is subtracted from the diesel injector pulse, 4.78 ms, (4.78 ms−1.22 ms) to provide 3.56 ms which corresponds to the amount of diesel delivered to the engine during the injector open time. This injector open time can be converted to an energy value by multiplying the injector open time by the flow rate of diesel fuel injector. The flow rate may be determined from a lookup table at the current fuel pressure of the diesel; i.e., 30 pound/hour at 42.5 psi=(30 pounds/3600 sec)=0.0083333 pounds/sec. This value can be multiplied by the injector open time (0.0083333 pounds*0.00356 sec), providing 0.0000296 pounds of diesel fuel per pulse. The diesel pound per pulse is then multiplied by a diesel fuel stoichiometric ratio; i.e., 14.5 pounds of air per pound of fuel, (0.0000296*14.5), providing 0.0004292 pounds of air to combust the diesel fuel.

The diesel fuel can be supplemented with a selected amount of a secondary fuel, such as natural gas. A ratio of diesel to natural gas can be determined from a lookup table based on desired target variables, including, for example, engine temperature, engine rpm, load etc. For example, a ratio of 20% diesel and 80% natural gas provides (0.0004292 pounds*0.20)=0.00008584 pounds of air for diesel and (0.0004292 pounds*0.80)=0.00034336 pounds of air for natural gas. This amount of air to combust the diesel fuel is then divided by the diesel fuel stoichiometric ratio; i.e., diesel=14.5 pound air for every pound of fuel, (0.00008584 pounds/14.5)=0.00000592 pounds of diesel fuel per pulse for the diesel injector. A flow rate of the diesel fuel for the diesel fuel injector (primary fuel) is determined at the current fuel pressure of the diesel fuel. This can be determined using a lookup table. For example, at a pressure of 15000 psi at 30 pounds/hr=30 pounds/3600 sec)=0.0083333 pounds/sec. The fuel demand, i.e., the amount of time needed to deliver the diesel fuel, is determined by dividing the diesel fuel gas needed by flow rate per second of diesel fuel injector; i.e., (0.00000592 pound/0.0083333)=0.00071 sec or 0.71 ms of fuel demand for diesel. The new injector pulse for the diesel fuel injector is determined by adding the fuel demand to the diesel fuel injector offset at the current system voltage for the diesel fuel injector and diesel fuel pressure. These values may be determined using a lookup table. For example, at a voltage of 12.5 volts and a pressure of 15000 psi, a delay time of 2.94 ms can be determined from the lookup table. The total injector pulse width is then the injector open time of 0.71 ms plus the delay time of 2.94 ms for a total injector pulse width of 3.65 ms to provide the desired 80% diesel fuel to the engine.

The amount of air to combust for natural gas is then divided by the natural gas fuel stoichiometric ratio; i.e., natural gas=17.2 pounds of air for every pound of fuel, (0.00034336 pounds/17.2) providing 0.000019962 pounds of alternate fuel per pulse for a secondary injector. A flow rate of the natural gas for the natural gas fuel injector (secondary fuel) is determined at the current fuel pressure of the natural gas and the temperature of the natural gas. As previously discussed, the flow rate may be determined using a lookup table. For example, at a temperature of 50 deg and a fuel pressure of 150 psi, the flow rate may be determined to be about 28 pounds/hr=28 pounds/3600 sec)=0.0077777 pounds/sec.

The fuel demand, i.e., the amount of time needed to deliver the natural gas, is determined by dividing the natural gas needed by flow rate per second of natural gas injector; i.e., (0.000019962 pounds/0.0077777 pounds/sec)=0.00257 sec or 2.57 ms fuel demand. The new injector pulse width for the secondary (natural gas) injector is determined by adding the fuel demand to natural gas injector offset at the current system voltage for the secondary injector and natural gas pressure. For example, a lookup table may be used to determine that at a voltage of 12.5 volts and a fuel pressure of 150 psi the delay time is approximately 2.94 ms. The total pulse width to deliver the desired secondary fuel per pulse is the 2.57 ms open time (fuel demand) plus the delay time of 2.94 ms for a total secondary injector pulse width of 5.51 ms.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method of determining a secondary fuel amount for an engine, comprising:
    measuring an injector signal from an engine's Engine Control Unit (ECU) for a primary injector for a primary fuel to determine a primary timing value for the primary injector;
    determining a delay time of the primary injector using a lookup table configured to provide the delay time of the primary injector to determine an open time of the primary injector based on a difference between the primary timing value and the delay time, the open time being used to calculate an amount of the primary fuel to be injected into the engine during the primary injector's open time, based on the injector signal;
    determining an amount of secondary fuel equivalent to the amount of primary fuel; and
    calculating a secondary timing value for a secondary injector signal for a secondary injector to deliver the amount of secondary fuel to the engine in place of the primary fuel.

2. The method of claim 1, wherein determining an open time further comprises measuring a pressure differential of the primary fuel and a voltage of the primary injector.

3. The method of claim 2, further comprising determining a delay time associated with the primary injector from the pressure differential and the voltage using a lookup table.

4. The method of claim 3, further comprising calculating an open time of the primary injector by subtracting the delay time from the primary timing value of the primary injector.

5. The method of claim 4, further comprising determining the amount of primary fuel to be delivered to the engine based on the injector signal by multiplying a flow rate of the primary fuel times the open time of the primary injector.

6. The method of claim 1, further comprising measuring a pressure differential of the secondary fuel.

7. The method of claim 1, further comprising measuring a voltage of the secondary injector used to inject the secondary fuel.

8. The method of claim 7, further comprising calculating a delay time associated with the secondary injector from the secondary fuel pressure and the secondary injector voltage using a lookup table.

9. The method of claim 8, wherein calculating the secondary timing value for the secondary injector further comprises adding the delay time of the secondary injector with an open time of the secondary injector sufficient to deliver the amount of secondary fuel to the engine.

10. The method of claim 1, wherein determining the amount of secondary fuel further comprises calculating an energy value associated with the amount of primary fuel and calculating the amount of secondary fuel needed to provide the energy value.

11. A secondary fuel control system for an engine, comprising:
    a detector configured to detect a timing value from an Engine Control Unit (ECU) injection signal for a primary injector;
    a lookup table coupled to the detector and configured to provide a delay time of the primary injector to determine an open time of the primary injector based on a difference between the timing value and the delay value, the open time being used to calculate a predetermined amount of the primary fuel to be injected into the engine during the primary injector's open time based on the ECU injection signal; and a secondary fuel equivalent module coupled to the lookup table and configured to calculate an amount of a secondary fuel having an energy equivalent to the predetermined amount of primary fuel by calculating an energy value of the predetermined amount of primary fuel, calculating the amount of the secondary fuel needed to provide the energy equivalent, and calculating a secondary timing value for a secondary injector to inject the energy equivalent of the secondary fuel into the engine in place of the primary fuel.

12. The secondary fuel control system of claim 11, wherein the secondary fuel equivalent module is further configured to receive at least one signal containing information of a fuel pressure for the primary fuel and a voltage at the primary injector to calculate the delay time of the primary injector.

13. The secondary fuel control system of claim 11, wherein the secondary fuel equivalent module is further configured to receive a signal containing information of a low side fuel pressure for the secondary fuel and a high side pressure of the secondary fuel to calculate a flow rate of the secondary fuel.

14. The secondary fuel control system of claim 11, wherein the secondary fuel equivalent module is further configured to receive a signal containing information of a tank pressure for the secondary fuel to calculate a fuel level signal for the secondary fuel.

15. The secondary fuel control system of claim 11, wherein the secondary fuel equivalent module is further configured to receive a signal containing information of a temperature for the secondary fuel to calculate a density of the secondary fuel.

16. The secondary fuel control system of claim 11, wherein the secondary fuel equivalent module is further configured to send a signal containing information of a fuel pressure for the primary fuel for use by the ECU.

17. The secondary fuel control system of claim 11, wherein the secondary fuel equivalent module is further configured to send a signal containing information of a fuel level for the secondary fuel for use by a fuel level indicator.

18. The secondary fuel control system of claim 11, wherein the secondary fuel equivalent module is further configured to send a signal containing information of an injector pulse for the secondary injector for the secondary fuel corresponding to the secondary timing value.

19. The secondary fuel control system of claim 11, wherein the secondary fuel equivalent module further comprises a communication port for programming and diagnostic testing.

20. The secondary fuel control system of claim 11, wherein the amount of secondary fuel calculated from the energy value of the primary fuel accounts for the delay times of the primary injector and the secondary injector.

21. A secondary fuel control system for an engine, comprising:

a detector configured to detect a timing value from an Engine Control Unit (ECU) injection signal for a primary injector;

a first lookup table coupled to the detector and configured to provide a delay time of the primary injector for injecting a predetermined amount of a primary fuel into the engine;

a second lookup table coupled to a secondary fuel equivalent module and configured to provide a ratio of secondary fuel to primary fuel for the engine;

a secondary fuel equivalent module coupled to the first lookup table and the second lookup table; the secondary fuel equivalent module configured to calculate an amount of a secondary fuel having an energy equivalent based on the ratio of secondary fuel to primary fuel by calculating an energy value of the predetermined amount of primary fuel, calculating an amount of the secondary fuel needed to supplement the primary fuel to provide the ratio, and calculating a secondary timing value for a second injector to inject the energy equivalent of the secondary fuel into the engine.

* * * * *